United States Patent
Hong

(10) Patent No.: US 6,919,877 B2
(45) Date of Patent: Jul. 19, 2005

(54) DIGITAL PHOTO ALBUM STORAGE DEVICE

(75) Inventor: Cuc Hong, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 229 days.

(21) Appl. No.: 09/991,388

(22) Filed: Nov. 15, 2001

(65) Prior Publication Data

US 2003/0090457 A1 May 15, 2003

(51) Int. Cl.$^7$ ................................................ G09G 5/00
(52) U.S. Cl. ........................ 345/156; 361/680; 434/317
(58) Field of Search ...................... 434/317; 206/308.1; 345/156; 369/75.1

(56) References Cited

U.S. PATENT DOCUMENTS

| | | | | |
|---|---|---|---|---|
| 4,855,725 A | * | 8/1989 | Fernandez | 345/173 |
| 5,109,354 A | * | 4/1992 | Yamashita et al. | 708/110 |
| D338,455 S | * | 8/1993 | Suge | D14/345 |
| 5,534,888 A | | 7/1996 | Lebby et al. | |
| 5,548,567 A | * | 8/1996 | Sawai | 369/30.39 |
| 5,572,399 A | * | 11/1996 | Shirato et al. | 361/680 |
| 5,703,624 A | | 12/1997 | van Kruistum | |
| 5,712,949 A | * | 1/1998 | Kato et al. | 386/96 |
| 5,713,683 A | * | 2/1998 | Bergh et al. | 402/79 |
| 5,847,698 A | | 12/1998 | Reavey et al. | |
| 5,914,707 A | | 6/1999 | Kono | |
| 5,991,594 A | * | 11/1999 | Froeber et al. | 434/317 |
| D419,534 S | * | 1/2000 | Kemp | D14/345 |
| D446,809 S | * | 8/2001 | Parker | D19/26 |

FOREIGN PATENT DOCUMENTS

| | | | | |
|---|---|---|---|---|
| WO | WO 01 86407 | * | 11/1999 | H04N/5/30 |
| WO | WO 99 56463 | * | 11/2001 | G06F/3/14 |

* cited by examiner

*Primary Examiner*—Sumati Lefkowitz
*Assistant Examiner*—Ming-Hun Liu

(57) ABSTRACT

The invention relates to a container configured to electronically display images and simulate a photo album storage device, including a storage housing having a bottom and a plurality of upwardly extending sides to concurrently store a plurality of removable digital memory storage devices. A display cover is coupled to the storage housing and includes a visual display device configured for open and closed positions. The display cover encloses the storage housing when in a closed, storage mode and exposes the display device when in an open, viewing mode. An electronic processing device, coupled to the storage housing and the visual display device is configured to read and display at least one of many contained removable memory storage devices and to display digital image data contained on the storage device.

22 Claims, 4 Drawing Sheets

DIGITAL PHOTO ALBUM STORAGE DEVICE

BACKGROUND OF THE INVENTION

1. Field of Invention

The present invention relates generally to photo albums. More particularly, this invention relates to an electronic storage media for containing and displaying photo images.

2. Background

Storage of photo images has been problematic for many years. Photographs are fragile, vulnerable items that require special attention when storing. Because dust, sunlight and water can damage photographic images, many people store photographs in albums specially designed for the purpose. Unfortunately, in order to effectively protect the photos and allow for continual viewing of the photos, albums such as these must be made secure enough to withstand long use and inadvertent abuse. Typically, these albums are heavy and voluminous and so require a large, secure space for storage.

Photographs which are related in theme or content, such as family photos, vacation pictures or the like, are often organized as part of a collection. Examples include albums dedicated to pictures of a particular child, pictures from a certain vacation, or pictures from a given period of time. Such collections or albums often become so large that they become unmanageable. Individual photos may be difficult to quickly access, as many albums must be inspected in order to locate a particular photo.

With the advent of digital cameras, many people are converting from traditional printed photos to images stored on digital memory devices, such as floppy disks, optical memory devices such as CD-ROMs, or more convenient devices such as memory sticks. While this new technology may allow many images to be stored on one medium, identification of content becomes a problem. Disks are easily mixed in bulk storage devices and are inconsistently labeled. Keeping disks in an orderly system with a practical indexing structure is very difficult.

Typically, a computing device such as a desktop or notebook computer has been required for viewing the digital images. Without access to this computer, the digital images are meaningless. A separate storage location has generally been needed for storing the memory devices in a meaningful order. Filing cases for floppy disks or CD-ROMs comprise the typical storage location. Because a desktop or notebook computer is primarily used for tasks other than viewing images stored on removable media, storage of digital photos continues to be segregated at its own location, separate from the display device. In this manner, the array of media disks does not interfere with the unrelated operation of the computer. As a result, viewing digital images stored on removable storage devices requires first locating the storage media and then transporting the media to the computer for viewing.

SUMMARY OF THE INVENTION

It has been recognized that it would advantageous to develop a container for the collective, library storage of memory storage devices which also is configured to be used to view the digital images stored on the memory devices. The present invention provides such a container that can be used to both centrally store and view images, eliminating the problems previously encountered by storing and viewing digital images in separate locations.

The present invention provides a container configured to electronically display images and simulate a photo album storage device, including a storage housing having a bottom and a plurality of upwardly extending sides to store a plurality of removable digital memory storage devices. A display cover is coupled to the storage housing and includes a visual display device configured for open and closed positions. The display cover encloses the storage housing when in a closed, storage mode and exposes the display device when in an open, viewing mode. An electronic processing device, coupled to the storage housing and the visual display device, is configured to read and display at least one of many contained removable memory storage devices and to display digital image data contained on the storage device.

In accordance with another, more detailed embodiment of the present invention, the container further includes a navigation data entry interface and navigation control circuitry to enable an operator to manipulate the stored digital images.

In accordance with another, more detailed embodiment of the present invention, the container further includes a data transmission and reception system coupled to the electronic processing device to allow a user to electronically send and receive data to and from the electronic processing device.

In accordance with another, more detailed embodiment of the present invention, the container further includes an image data information display to communicate to the user information relating to the stored digital images.

In accordance with another, more detailed embodiment of the present invention, the container further includes a plurality of storage compartments contained within the storage cavity portion to concurrently store a plurality of removable digital memory storage devices. The storage compartments can be storage sleeves hingedly coupled within the storage compartment to accept for storage a digital memory storage device.

In accordance with another, more detailed embodiment of the present invention, the container further includes a telephone communication system, configured to be connectable to a telephone network to allow a user to telephonically communicate with others while viewing the displayed digital image data.

In accordance with another, more detailed embodiment of the present invention, the navigation data entry interface further comprises at least one touch key button.

In accordance with another, more detailed embodiment of the present invention, the navigation data entry interface further comprises a touchscreen interface on the visual display device.

In accordance with another, more detailed embodiment of the present invention, the navigation data entry interface further comprises a remote navigation device in data communication with the navigation control circuitry to enable a user to remotely navigate through the displayed digital image data.

Other aspects and advantages of the present invention will become apparent from the following detailed description, which, in conjunction with the accompanying drawings, illustrates by way of example the principles of the present invention.

DETAILED DESCRIPTION OF THE INVENTION

Figure 1:
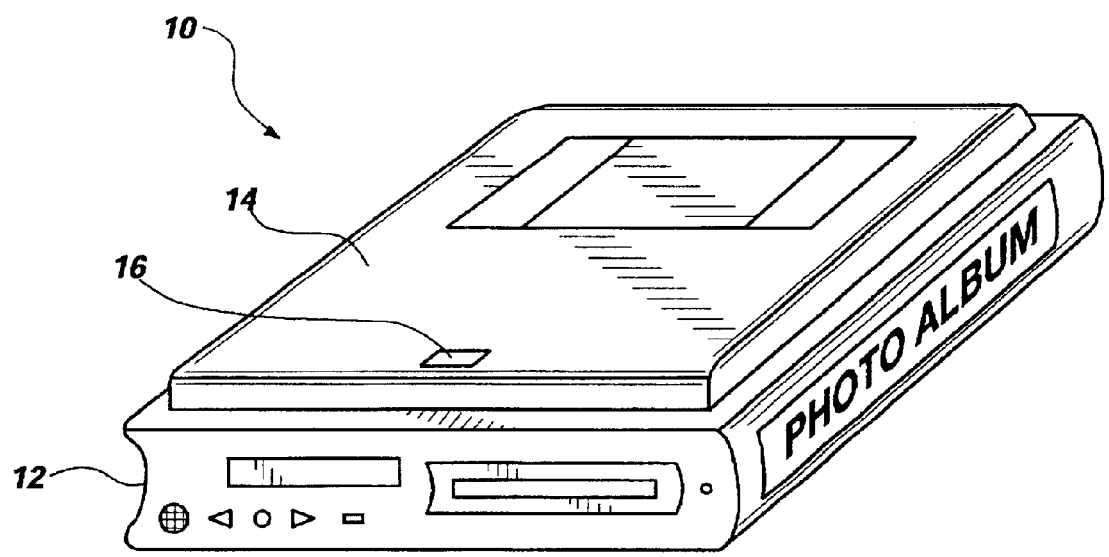
FIG. 1 is a perspective view of the present invention in a closed, storage configuration.

For purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

FIGS. 1 through 4 show a digital photo album storage system 10, in accordance with the present invention. This system can be used to conveniently and centrally store and view digital images contained on a variety of memory storage devices. The photo album provides both organization and access to all desired images without the need of an external computing device.

FIG. 1 illustrates the photo album when in a closed, storage mode. A lower storage housing 12 is provided as a storage area for a plurality of memory storage devices, as well as a housing for all necessary electronic equipment for viewing images stored on the storage devices. A display cover 14 can be used to cover the lower housing when not in use. A securing and release mechanism 16 is provided to secure the display cover when in storage mode and allow a user to release the display cover into a viewing mode.

Figure 2:
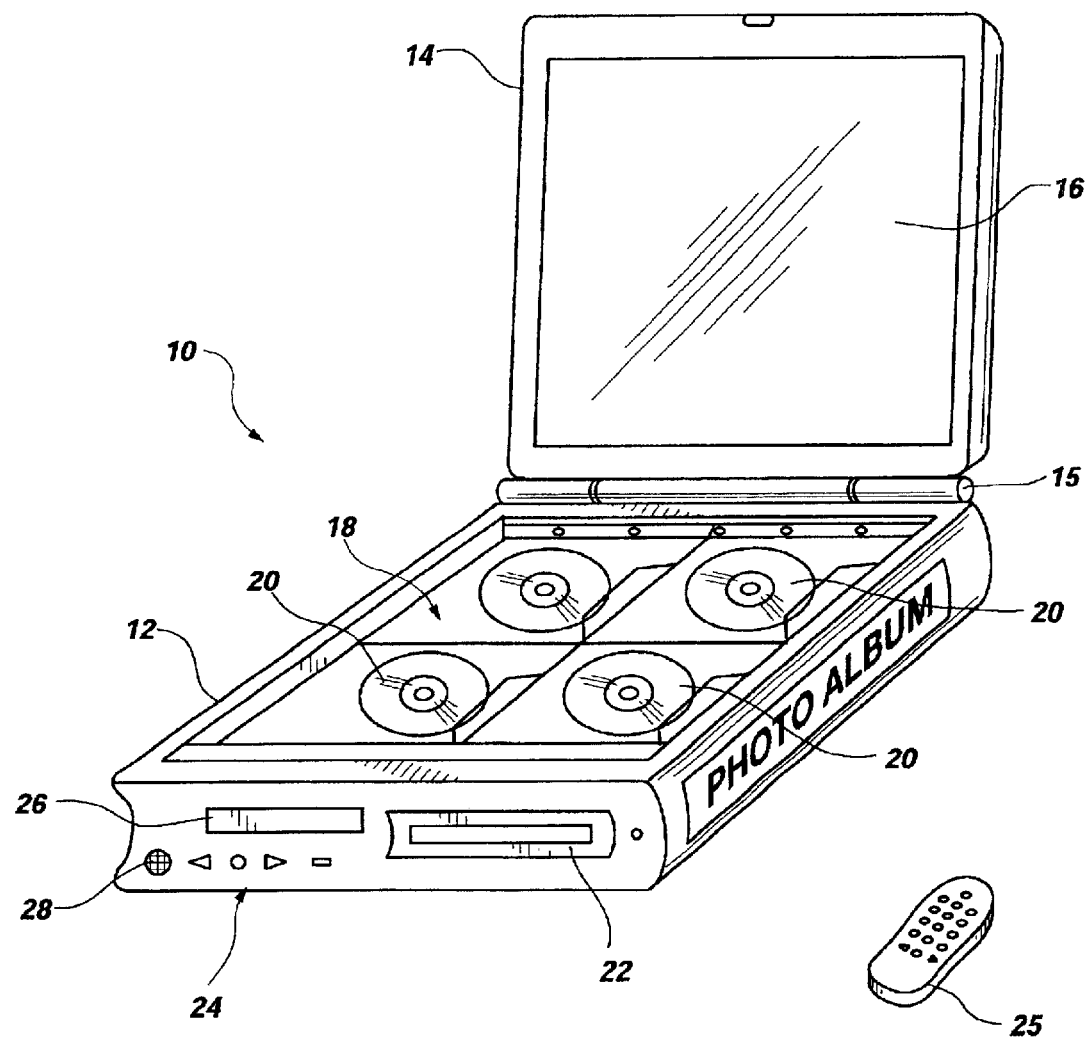
FIG. 2 is a perspective view of the invention shown in FIG. 1, in an open, viewing configuration.

As shown in FIG. 2, when the display cover 14 is released from a storage mode, a visual display device 16 is exposed to the user. In the embodiment of FIG. 2, the display cover 14 is hingedly coupled to the storage housing 12 at hinge 15. The display cover could also be removably attached to the storage housing by other means commonly known in the art. The visual display device may be an LCD, CRT or other suitable display device. Additionally, the display device may be a touchscreen interface device to accept input from a user.

Also exposed by opening the display cover is storage cavity 18 (shown in side detail in FIGS. 3a and 3b), contained within the storage housing 12. The storage cavity 18 advantageously provides storage area for a plurality of removable digital memory storage devices 20, as known to those skilled in the art, including floppy diskettes, CD-ROMs, DVDs, memory flash cards, etc. The embodiment illustrated in FIG. 2 provides four sections, each capable of storing a number of such memory storage devices. Of course, the storage cavity 18 can be configured in any number of ways, to store any number of memory devices.

An electronic processing device 30 (shown in alternate embodiments in FIGS. 3a and 3b) is provided to receive the removable memory storage devices 20 and process and display the digital images contained on the storage devices on the visual display device 16. The electronic processing device can include a portal 22 through which one or more removable memory storage devices can be inserted into the electronic processing device. Navigation data entry interface keys 24 are provided to allow the user to navigate through the images stored on the removable memory storage device. The navigation data interface can be used to select a particular image from the removable storage device for viewing on the display screen. It can also be used to manipulate the image displayed on the display device, i.e., zoom, pan, etc., or to send the image data through a modem or USB transfer device 32 (shown in FIGS. 3a and 3b). A remote navigation data interface 25 can be used to remotely navigate through the image data. The remote navigation device can be used, for instance, to present a slide show of images stored on the storage devices.

Figure 3A:
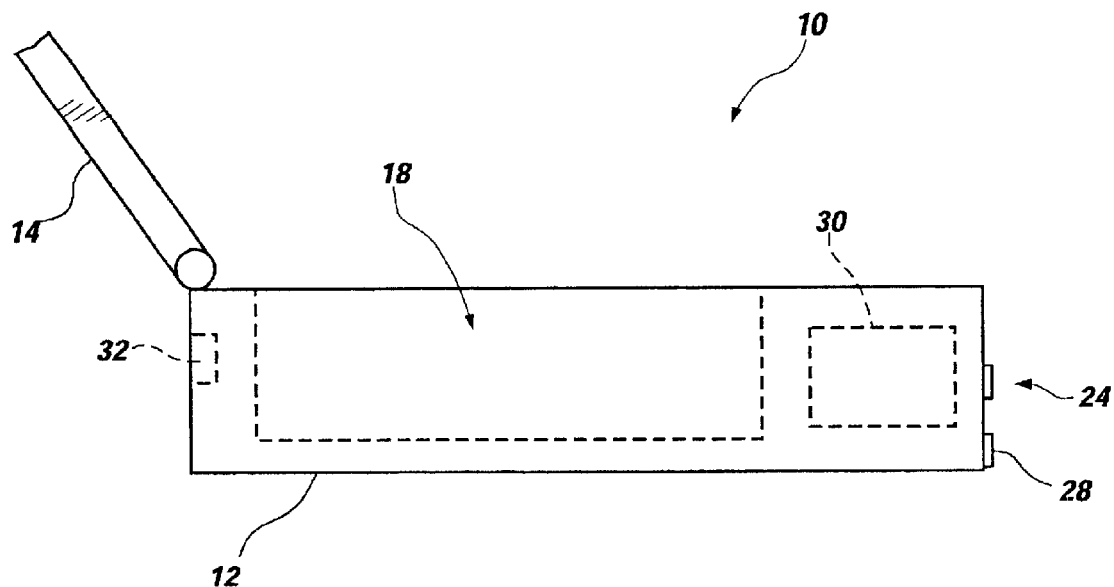
FIG. 3a is a side schematic view of one embodiment of the present invention.
Figure 3B:
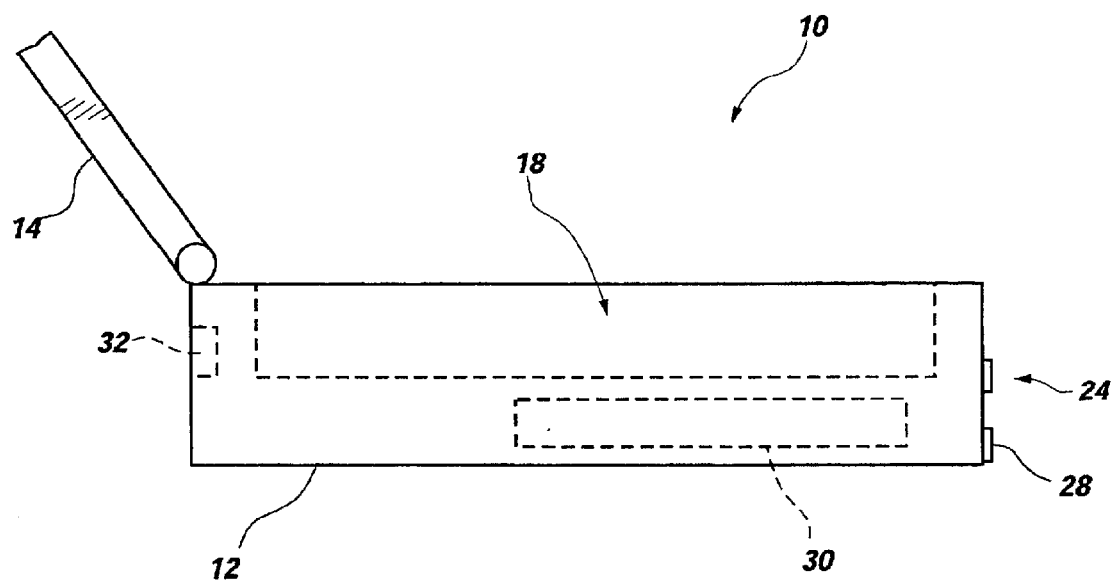
FIG. 3b is a side schematic view of another embodiment of the present invention.

An image data information display 26 is provided to facilitate navigation through the image data contained on the removable storage devices 20 currently contained in the electronic processing device 30 (shown in FIGS. 3a and 3b). The image information display can display information relating to names and sizes of the data files contained on the removable memory storage device contained in the processing device. Also provided is a telephone communication system, such as the speaker phone 28 shown in FIG. 2, which can be connected to a telephone network. The telephone communication system advantageously allows multiple, remotely located users to discuss the image being viewed, which can have been sent from one user to another through the transfer device 32.

Turning now to FIGS. 3a and 3b, it will be appreciated that the storage cavity 18 can be configured in many ways to accommodate the electronic processing device 30 and peripheral devices such as the data transmission device 32. As the size of the processing device 30 will vary depending on the type of removable memory storage devices being used, the size and location of the processing device can vary accordingly. As shown in FIG. 3a, where the memory device is small enough, for instance, to be inserted into a side of the storage housing 12, the processing device can be located toward the front 13 of the storage housing. Where the memory device in use is larger, such as a CD-ROM or DVD, the processing device 30 can be placed beneath the storage cavity 18, in order to maximize the space available for storage of removable memory devices (not shown in FIGS. 3a and 3b). Maximizing the size and shape of the storage cavity based on processing needs can maximize the storage space available for storage media.

Figure 4:
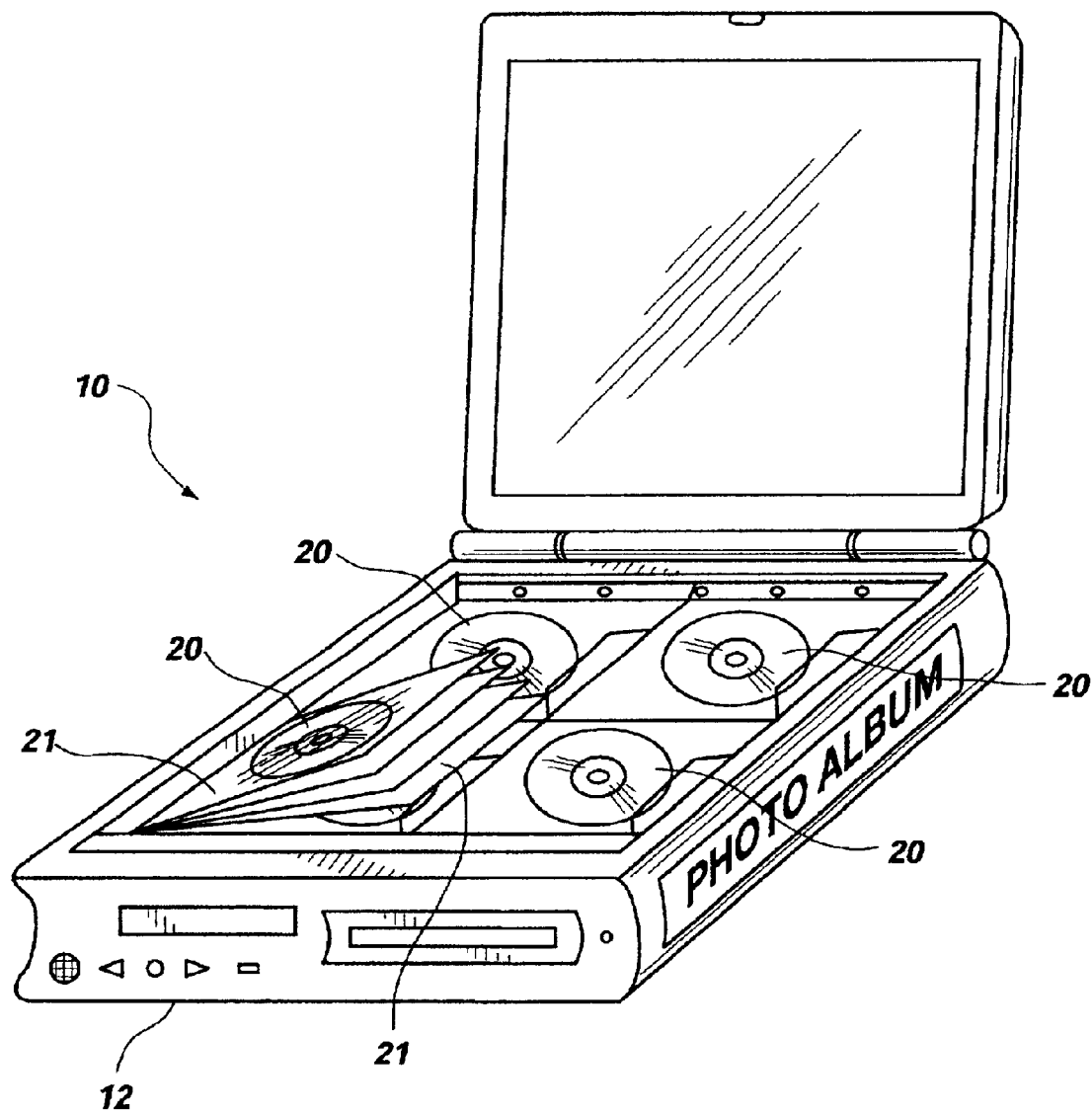
FIG. 4 is a perspective view of one embodiment of the invention shown in FIG. 1.

Shown in FIG. 4 is an alternate embodiment of the present invention, which includes conventional storage sleeves 21 in which storage devices 20 can be stored. The storage sleeves 21 can be hingedly coupled within the storage cavity 18, to maximize ease of access to the storage devices while maximizing the number of devices that can be stored in the cavity. Of course, any type of storage compartment can be used within the storage cavity, or the storage cavity can be used independently to stack storage media within.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A container configured to electronically display images and simulate a photo album storage device, comprising:

a portable storage housing having a bottom and a plurality of upwardly extending sides, the upwardly extending sides defining at least one storage cavity portion within the storage housing, the at least one storage cavity portion being configured to concurrently store a plurality of removable digital memory storage devices; a display cover coupled to the storage housing, the cover including a visual display device and being configured for open and closed positions to directly cover the storage cavity portion of the storage housing when in a closed, storage mode and to directly expose the storage cavity and allow access to the plurality of removable digital memory storage devices and directly expose the visual display device at a viewing position when in an open, viewing mode, wherein images from the digital memory storage devices are displayed; and an electronic processing device, separate from the storage cavity portion and coupled to the storage housing and the visual display device, the processing device being configured to accept at least one of the plurality of removable memory storage devices and to process and display digital image data contained on the storage device.

2. A container as in claim 1, further comprising a navigation data entry interface and navigation control circuitry, each operatively coupled to the processing device to enable an operator to manipulate the digital images stored on the at least one removable digital photo memory storage device contained in the processing device.

3. A container as in claim 1, further comprising a data transmission and reception system coupled to the electronic processing device, the transmission and reception system being configured to allow a user to electronically send and receive data to and from the electronic processing device.

4. A container as in claim 1, further comprising an image data information display, operatively coupled to the container, the information display being configured to communicate to the user information relating to the digital images contained on the removable digital photo memory storage device contained in the processing device.

5. A container as in claim 1, further comprising a plurality of storage compartments contained within the storage cavity portion, the storage compartments being configured to concurrently store a plurality of removable digital photo memory storage devices.

6. A container as in claim 1, further comprising a telephone communication system, coupled to the storage housing, the communication system being configured to be connectable to a telephone network to allow a user to telephonically communicate with others while viewing the digital image data displayed on the visual display screen.

7. A container as in claim 1, the visual display device is configured for open and closed positions to cover the storage housing when in a closed, storage mode and to adopt a substantially vertical position when in an open, viewing mode.

8. A container configured to electronically display images and simulate a photo album storage device, comprising:
   a portable storage housing having a bottom and a plurality of upwardly extending sides, the upwardly extending sides defining at least one storage cavity portion within the storage housing, a plurality of storage compartments contained within the storage cavity portion, the storage compartments being configured to concurrently store a plurality of removable digital memory storage devices; a display cover coupled to the storage housing, the display cover including a visual display device for displaying digital images and being configured for open and closed positions to directly cover the storage cavity portion of the storage housing when in a closed, storage mode and to directly expose the storage cavity and allow access to the plurality of removable digital memory storage devices and directly expose the visual display device at a viewing position when in an open, viewing mode, wherein images from the digital memory storage devices are displayed; a electronic processing device, coupled to the storage housing and the visual display device, the processing device being configured to accept at least one of the plurality of removable memory storage devices and to process and display digital image data stored on the memory storage devices; a navigation data entry interface and navigation control circuitry, each operatively coupled to the processing device to enable an operator to manipulate the digital images stored on the at least one removable memory storage device contained in the processing device.

9. A container as in claim 8, wherein the navigation data entry interface further comprises at least one touch key button.

10. A container as in claim 8, wherein the navigation data entry interface further comprises a touchscreen interface on the visual display device.

11. A container as in claim 8, wherein the navigation data entry interface further comprises a remote navigation device in data communication with the navigation control circuitry, the remote navigation device being configured to enable a user to remotely navigate through the digital image data displayed on the visual display device.

12. A container as in claim 8, wherein the storage compartments further comprise storage sleeves hingedly coupled within the storage compartment, the storage sleeves being configured to each accept for storage at least one of the digital photo memory storage device.

13. A container as in claim 8, wherein the visual display device is configured for open and closed positions to cover the storage housing when in a closed, storage mode and to adopt a substantially vertical position when in an open, viewing mode.

14. A container configured to simulate a photo album storage device and to electronically display images, comprising:
   an electronic data processing device configured to process and display digital image data;
   a portable case encompassing the electronic data processing device, comprising upwardly and outwardly extending walls which extend vertically above and laterally beyond the electronic processing device to define a storage cavity;
   a plurality of storage compartments, separate from the data processing device and contained within the storage cavity, the storage compartments each being configured to concurrently store a plurality of removable digital photo memory storage devices;
   a visual display device coupled to the case, the display device being configured to directly cover the storage cavity when in a closed, storage mode and to directly expose the storage cavity and allow access to the plurality of removable digital memory storage devices and directly expose a viewing screen when in an open, display mode; and
   a receptacle separate from the storage cavity and coupled to the electronic processing device, the receptacle being configured to receive at least one removable digital photo memory storage device and to process digital image data stored on the digital photo memory storage device and display said data on the visual display device.

15. The container as in claim 14, further comprising a navigation data entry interface and navigation control circuitry, each operatively coupled to the processing device to enable an operator to manipulate the digital images stored on the at least one removable digital photo memory storage device contained in the processing device.

16. The container as in claim 15, wherein the navigation data entry interface further comprises a touchscreen interface on the visual display device.

17. The container as in claim 15, wherein the navigation data entry interface further comprises a remote navigation device in data communication with the navigation control circuitry, the remote navigation device being configured to enable a user to remotely navigate through the digital image data displayed on the visual display device.

18. A container as in claim 14, further comprising a plurality of storage compartments, separate from the electronic data processing device and contained within the storage cavity portion, the storage compartments being configured to concurrently store a plurality of removable digital photo memory storage devices.

19. A container as in claim 14, further comprising a data transmission and reception system coupled to the electronic processing device, the transmission and reception system being configured to allow a user to electronically send and receive data to and from the electronic processing device.

20. A container as in claim 14, wherein the storage housing further includes a telephone communication system, configured to be connectable to a telephone network to allow a user to telephonically communicate with others while viewing the digital image data displayed on the visual display screen.

21. A container as in claim 14, further comprising an image data information display, operatively coupled to the container, the information display being configured to communicate to the user information relating to the digital images contained on the removable digital photo memory storage device contained in the processing device.

22. A container as in claim 14, wherein the display device is configured for open and closed positions to cover the storage housing when in a closed, storage mode and to adopt a substantially vertical position when in an open, viewing mode.

* * * * *